(12) United States Patent
Hugert et al.

(10) Patent No.: US 6,699,348 B2
(45) Date of Patent: Mar. 2, 2004

(54) METHOD FOR FILTER FABRICATION

(75) Inventors: Sverker Hugert, Trosa (SE); Jan Kogner, Trosa (SE)

(73) Assignee: Camfil AB (SE)

( * ) Notice: Subject to any disclaimer, the term of this patent is extended or adjusted under 35 U.S.C. 154(b) by 151 days.

(21) Appl. No.: 09/834,518

(22) Filed: Apr. 13, 2001

(65) Prior Publication Data

US 2002/0148554 A1 Oct. 17, 2002

(51) Int. Cl.$^7$ ............................................. B01D 39/60
(52) U.S. Cl. .................... 156/242; 156/293; 156/303.1; 55/502; 210/493.2; 264/263; 264/271.1; 264/273
(58) Field of Search ................. 264/261, 263, 264/271.1, 273, 274, 279; 156/293, 242, 303.1; 210/493.1, 493.2, 493.3, 493.5; 55/497, 502

(56) References Cited

U.S. PATENT DOCUMENTS

| | | | |
|---|---|---|---|
| 2,038,071 A | 4/1936 | Wilhelm | 183/4 |
| 2,227,385 A | 12/1940 | Benedict | 154/47 |
| 2,663,660 A | 12/1953 | Layte | 154/81 |
| 3,075,337 A | 1/1963 | Andreae | 55/446 |
| 3,111,489 A | 11/1963 | Getzin | 210/232 |
| 3,183,286 A | 5/1965 | Harms | 264/45 |
| 3,220,167 A | 11/1965 | Van Der Ster et al. | 55/269 |
| 3,413,782 A | 12/1968 | Bartlett | 55/485 |
| 3,498,032 A | 3/1970 | Scott | 55/471 |
| 3,581,479 A * | 6/1971 | Goulet et al. | 55/499 |
| 3,710,562 A | 1/1973 | McKenzie | 55/487 |
| 3,752,321 A | 8/1973 | McLaren | 210/493 |
| 3,802,168 A | 4/1974 | Decks | 55/473 |
| 3,856,488 A | 12/1974 | Kato et al. | 55/300 |
| 3,880,627 A | 4/1975 | Morton | 55/499 |
| 3,914,116 A | 10/1975 | Westlin | 55/500 |
| 4,008,060 A | 2/1977 | Andreae | 55/446 |
| 4,135,900 A | 1/1979 | Westlin et al. | 55/499 |

(List continued on next page.)

FOREIGN PATENT DOCUMENTS

| | | | |
|---|---|---|---|
| CH | 676 800 | 3/1991 | B01D/45/12 |
| DE | 2407329 | 9/1974 | B01D/39/20 |
| DE | 2718217 | 11/1978 | B01D/46/52 |
| DE | 2948249 | 10/1980 | B01D/46/12 |
| DE | 3219671 | 12/1983 | B01D/39/14 |
| DE | 8617256.5 | 1/1987 | B01D/39/18 |
| EP | 0 377 419 | 7/1990 | B01D/46/52 |
| FR | 2 135 456 | 12/1972 | B01D/25/00 |
| FR | 2 490 970 | 4/1982 | B01D/39/00 |
| GB | 1 272 564 | 5/1972 | B01D/39/08 |
| NL | 6614283 | 5/1957 | |

OTHER PUBLICATIONS

*Clean Room Filters, A Guide*, Camfil AB; p. 22.
*Laminar Airflow Uniformity Downstream of HEPA and ULPA Filters*, Swiss Contamination Control, J. Gustavsson, Camfil AB, 1990.

Primary Examiner—Jeff H. Aftergut
Assistant Examiner—Barbara J Musser
(74) Attorney, Agent, or Firm—Hayes Soloway P.C.

(57) ABSTRACT

A method for the fabrication of a filter in a frame where a pre-formed pleated filter matrix is inserted into an injection mold tool. Then a suitable elastic thermoplastic material is injected into the tool. The amount of elastic thermoplastic material injected is less than the available space between the filter matrix and the tool so that the pressure will rapidly drop as the material flows from the point of injection.

9 Claims, 2 Drawing Sheets

U.S. PATENT DOCUMENTS

| | | | |
|---|---|---|---|
| 4,227,953 A | 10/1980 | Wasielewski et al. ........ 156/227 |
| 4,444,575 A | 4/1984 | Miller et al. .................. 55/316 |
| 4,610,706 A | 9/1986 | Nesher ......................... 55/497 |
| 4,615,804 A | 10/1986 | Wright .................... 210/493.1 |
| 4,619,675 A | 10/1986 | Watanabe ..................... 55/498 |
| 4,687,579 A | 8/1987 | Bergman ..................... 210/347 |
| 4,728,426 A | 3/1988 | Rudinger et al. ........ 210/493.3 |
| 4,799,944 A | 1/1989 | Dixon et al. .................. 55/446 |
| 4,810,379 A | * 3/1989 | Barrington ................. 210/232 |
| 5,015,377 A | 5/1991 | Silvera .................... 210/323.2 |
| 5,071,555 A | 12/1991 | Enbom .................... 210/493.5 |
| 5,156,661 A | 10/1992 | Adiletta ....................... 55/381 |
| 5,215,609 A | 6/1993 | Sanders ........................ 156/70 |
| 5,236,480 A | 8/1993 | Svensson et al. ........... 55/385.2 |
| 5,429,742 A | 7/1995 | Gutman et al. ......... 210/321.75 |
| 5,744,036 A | 4/1998 | Choi ........................ 210/493.5 |
| 5,888,262 A | 3/1999 | Kahler ......................... 55/497 |
| 5,891,208 A | 4/1999 | Gil ............................... 55/482 |
| 5,928,396 A | 7/1999 | Choi ............................ 55/379 |
| 6,010,548 A | 1/2000 | Burkhead et al. ............. 55/378 |
| 6,036,752 A | 3/2000 | Reuter ............................ 96/67 |
| 6,165,403 A | * 12/2000 | Michaelis et al. .......... 264/261 |
| 6,176,890 B1 | 1/2001 | Svedlind et al. .............. 55/524 |

* cited by examiner

METHOD FOR FILTER FABRICATION

BACKGROUND OF THE INVENTION

For efficient manufacturing of filters it is known to insert a pleated or folded filter matrix into an injection molded plastic frame. Glue is then filled into the space between the filter matrix and the frame to fix and seal the filter matrix in the frame. The glue is then allowed to harden. This may take some time and either means a slowing down of the manufacturing process or requires cost increasing intermediate storage before the filter is packed or subjected to additional working steps. The glue must have precisely the right viscosity when administrated to the space between the filter matrix and the filter frame. This means that without proper and costly apparatus a great many filters are rejected because of leaks and they may also at times lack in appearance with glue here and there. There exists therefore for this type of filter a need for an improved way to seal the filter matrix in the frame.

BRIEF DESCRIPTION OF THE INVENTION

In accordance with the invention the above object is solved by the following steps:

a) A preformed pleated filter matrix is provided in which the plead ends are sealed, e.g. by continuous applied glue strings (or by dipping the ends in glue).

b) Then, the filter matrix is placed in a frame.

c) A tool is held against said filter and the frame.

d) Finally, a heated sealing thermoplastic material is injected under pressure into a space between the filter matrix, frame and tool. The volume of the injected material is less than the actual volume of the space between filter matrix and frame, so that the entire space is never entirely filled.

The injected thermoplastic material will in the same process step be shaped by the tool and form a seal between filter matrix and frame.

Surprisingly enough the expected total collapse of the unsupported filter matrix does not occur. The reason for this is presumably that although the pressure of the entering thermoplastic material is very high the pressure at the propagation front of the injected material will be approximately the same as the surrounding atmospheric pressure. From the injection point the pressure will thus fall rapidly, preventing the total pressure on the filter from crushing the pleats, which would inevitably occur if a remaining free space was not left unfilled.

The high pressure used with injection molding technique makes it possible with a fast filling process and since the space between frame and filter matrix is comparatively narrow the thermal content of the sealing material will rapidly be taken by the surrounding, frame, filter material and air so that also the hardening will be fast. Since the filter pleats are sealed in their ends it is not necessary for the seal between the matrix and the frame to cover the entire ends of the pleats, and it is instead sufficient if only a continuous seal is established all around the filter matrix. Since the seal material is only visible on the top of the filter the local amount or how far deep the sealant extends does not influence the appearance of the filter. The pressure of the sealant when injected is still sufficient to result in a good filling out of the tool so that a very controlled appearance of the ready filter can be achieved.

If too much material tends to agglomerate at some location the propagation front will there advance down into the space preventing a build up of too high pressures and forces on the pleats. However since the space normally becomes more narrow downwards the flow resistance will increase inducing an even distribution around the filter. The ends of the filter pleats will also function to this end since the pleats taper downwards.

In particular in the case of large filters, previously it sometimes was necessary to provide several sealant inlets into the space between the matrix and the frame in order not to reach too high pressures locally. This is undesired since every inlet is comparatively expensive and there are many different filters meaning high tooling costs. Another feature and advantage of the present invention uses the filter frame itself or the filter frame in combination with a molding tool or some other part of the filter to form a distribution channel for the sealant around the filter. In order to increase the pressure and thus the transport in the channel without increasing the pressure and thus forces on the filter matrix holes are provided in a wall or flange of the filter through which the sealant may flow.

Alternatively a protective layer on the filter matrix that extends laterally out from the matrix may have openings allowing only a restricted flow into the sealing area. The openings or passages may be of different size and distribution to promote an even distribution all around the filter. This may be used to save tooling costs. The protective layer also may serve as a transport protection that is removed when the filter is used, or may be permanent and air permeable.

Normally a filter is then completed in a subsequent step by the application of a gasket. This gasket may be of foam that is applied on top of a lateral flange or groove a nozzle following the contour of the filter. By careful control of viscosity nozzle size, speed etc the gasket can be given comparatively accurate dimensions. This way of fabricating the gasket is however due to the many requirements troublesome and frequently results in adjustment work and rejection which is most undesired. In accordance with a further feature of the invention it is also possible to achieve this gasket in a simple, reliable and fast manner.

This is achieved by a manufacturing step in which the filter matrix is sealed relative the frame and the surrounding gasket for the frame molded by the tool. An elastic thermoplastic material is used for the gasket and the seal between filter matrix and frame.

The channel in the tool or between the tool forming the gasket can advantageously be used also to distribute the sealing material around the filter to give a more uniform distribution before the sealant enters into the space between matrix and frame. Also possible holes in the frame become hidden between gasket and seal and at the same time they can serve to "rivet" the gasket to the frame. By using holes or passages from the gasket "channel" in the tool the elastic material is forced to fill out the gasket before entering into the seal space, which will therefore occur comparatively uniform around the filter.

BRIEF DESCRIPTION OF THE DRAWINGS

Additional advantages and characteristics of the invention are apparent form the following description of preferred embodiments of the invention shown with reference to the enclosed drawings, wherein.

DETAILED DESCRIPTION OF THE INVENTION

Figure 1:
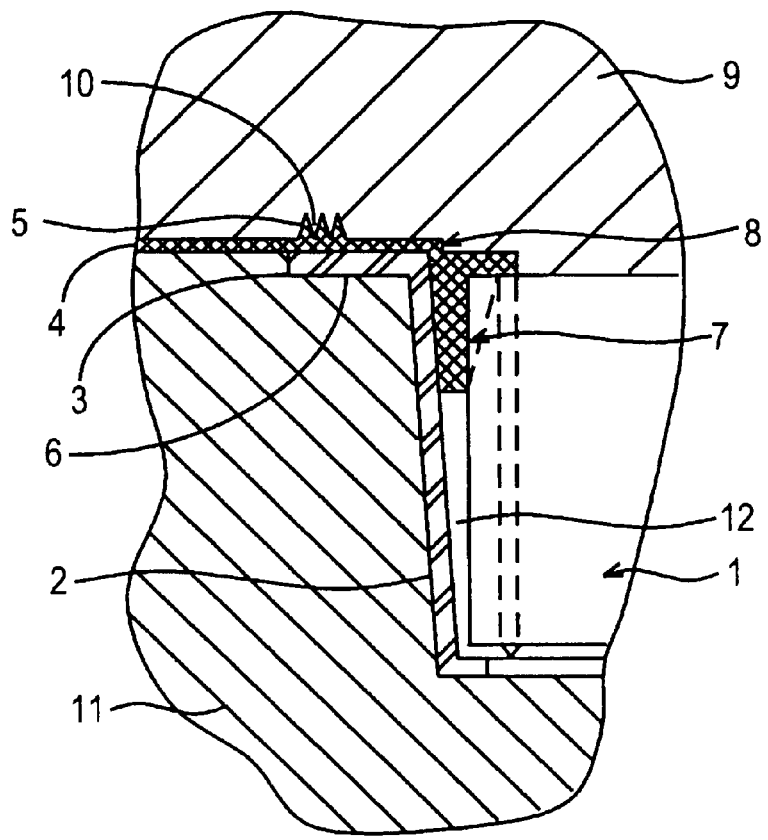
FIG. 1 shows a part cross section of a filter in accordance with the invention and FIG. 2 a part cross section of a second embodiment of a filter in accordance with the invention.

The filter shown in FIG. 1 is constituted by a filter matrix 1 and a filter frame 2. An integrated gasket 3 and a seal 4 between the filter matrix 1 and the frame 2 is shaped by an upper tool half 9. Elastic thermoplastic material is injected through an inlet 4 into a channel 5 located on the upper side of a lateral flange 6 of the filter frame 2. The channel molds a gasket. The channel is in communication with the space 7 between the filter matrix 1 and the frame 2 via grooves 8 in the upper tool half 9 that otherwise is in contact with the frame hereby controlling the lateral position of the frame. The bottom tool 11 may be the same tool that is used for injection molding the filter frame 2.

The channel 5 is provided with a sawtooth cross section so that the formed gasket will have a number of flanges or lips extending upwards. The grooves 10 between the flanges give restrictions for the sealing material and thereby force this to flow along the channel to giving an even distribution along the sides of the frame. By dimensioning these grooves with the corresponding flanges in the upper tool half as well as the channel on the upper side of the flange and the connecting holes it is possible to achieve a far more even distribution of a sealing material around the filter before the sealing material starts to flow into the space between the frame and the filter matrix. In this way an uniform filling or injection of the sealing material between filter matrix frame is achieved.

Instead of grooves a narrow slot may be provided between tool and frame for the restricted sealant flow providing the desired pressure drop between the injection molded part and the filled out space.

Figure 2:
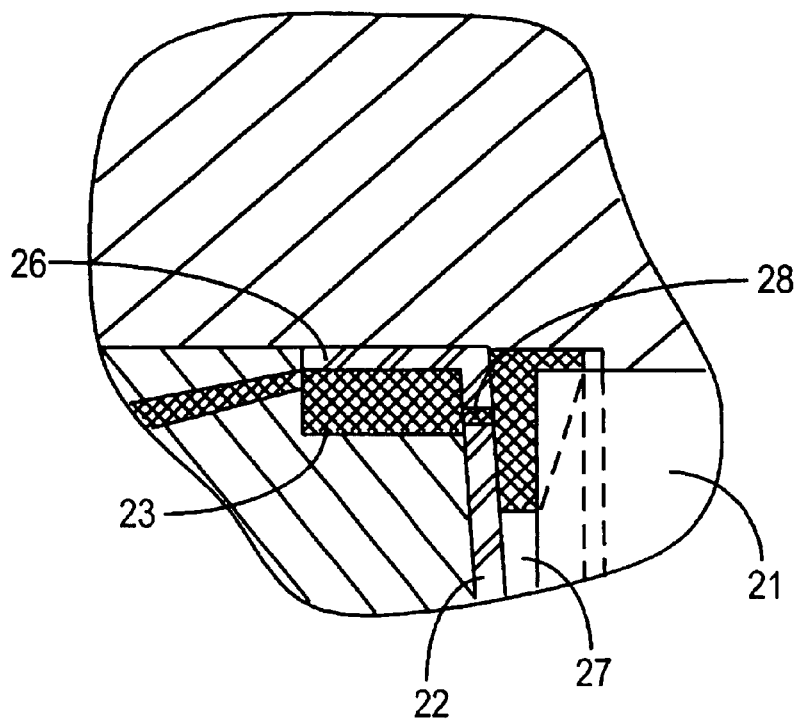

The embodiment in FIG. 2 has the gasket 23 on the bottom side of the flange 26 and holes 28 in the side of the frame to let sealing material into the space 27 between matrix 21 and frame 22.

Holes may also extend through the flange to shape a gasket on top of the flange and the sealant may be allowed also to enter into the space between matrix and frame from the top as well as through the sides of the frame.

The filter matrix is made of pleated filter material that before the final pleating has been provided with glue strings for gluing together the filter pleats to a filter matrix. The glue strings are but for those along the edges intermittent in order to promote the triangular shape of the filter pleats since this is considered to be the best shape from flow considerations. The glue strings along the edges, perhaps some millimeters from the edges however include more material securing that the filter matrix when the filter material is pleated together will become entirely sealed between the filter pleats. This means that it is only necessary with a seal around the upper (or lower) edge of the filter matrix in order to seal the matrix in the frame. In the narrow space between the filter matrix and the frame the ends of the pleats constitute a limp-sack shaped restriction that closes to the upper surface of the filter has a comparatively large cross section while the restriction has to be past with the reduction in cross section downwards resulting in turn in a successively back-counter pressure for the entering sealing material supporting the distribution of the sealing material around the filter. In the ends of the filter the length of the filter pleats are located and no similar restriction exists and it is therefore easier for the sealing material to flow down between the matrix and frame. Therefore the openings leading into this space are smaller to reduce the pressure. Also the filter matrix can here be made stronger by an increased number of additional glue strings, only extending over one or a pair of pleats.

By means of the invention it becomes possible to achieve in one step fixation and sealing of the filter matrix in the frame and the manufacture of the gasket that may be located on the top or bottom of a flange or indeed on the outside of the filter frame.

Since the gasket is shaped by a tool it will receive exact and identical look from filter to filter improving the look of the fabricated filter. The number of steps in the manufacturing process is reduced as is the cost.

What is claimed is:

1. A method of sealing of a filter matrix relative to a gasket comprising the steps of:
   a) providing a pleated filter matrix the ends of which pleats are sealed;
   b) positioning a tool against the filter matrix and surrounding the filer matrix at least in part; and
   c) injecting a thermoplastic sealant under pressure into a space between the filter matrix and the tool, the volume of the injected sealant being less than the actual volume of the space between the filter matrix and the tool.

2. A method sealing of a filter matrix of a preformed pleated filter material in a filter frame, comprising the steps of:
   a) providing a pre-formed pleated filter matrix that is sealed at its edges with glue;
   b) placing the filter matrix in a frame;
   c) positioning a tool against the filter matrix and frame; and
   d) injecting a thermoplastic sealant material under pressure into a space between the filter matrix, the frame and the tool, the volume of thermoplastic material being injected being less than the actual volume of space between the filter matrix, the frame and the tool, wherein a continuous seal is established between the filter matrix and the frame.

3. A method for sealing of a filter matrix of pleated filter material in a filter frame, comprising the steps of:
   a) providing a pre-formed pleated filter matrix the ends of which pleats are sealed with glue;
   b) placing the pre-formed filter matrix in a frame;
   c) positioning a tool against the filter and the frame; and
   d) injecting thermoplastic sealant material under pressure into a space between the filter matrix, the frame and the tool, the volume of injected thermoplastic material being less than the actual volume of the space between the filter matrix, the frame and the tool, wherein a continuous seal is established between the filter matrix and the frame.

4. The method according to claim 3, wherein the sealant is distributed around the filter frame by a channel formed in the tool facing the frame, said channel having a corresponding ridge or bar, the filter frame being provided with connections or holes for transfer of sealing material from a distribution channel to the space between the filter matrix, the frame and the tool.

5. The method according to claim 4, wherein holes are arranged in the frame between the distribution channel and the space so that sealant arrives into the space between the filter matrix, the frame and the tool at different times, whereupon sealant that arrives first hardens first to cause additional flow resistance to later arriving sealant.

6. The method according to claim 3, wherein that the sealant is distributed around the filter frame by a channel in the tool facing the frame, said channel having ridges or grooves so that the formed sealant will have a number of flanges.

7. The method according to claim 3, wherein the tool is positioned to only cover a flange or edge of the filter frame and the space between matrix and frame.

8. The method according to claim 4, wherein the sealant comprises thermoplastic elastic material, which is injected into the distribution channel to form a gasket for the filter.

9. The method according to claim 3, where the sealant holds a protection layer for the filter in place prior to use.

* * * * *